(12) United States Patent
Lukoschat et al.

(10) Patent No.: US 10,838,068 B2
(45) Date of Patent: Nov. 17, 2020

(54) OBSTACLE AVOIDANCE SYSTEM FOR AIRCRAFT

(71) Applicant: Textron Aviation Inc., Wichita, KS (US)

(72) Inventors: Jens Jorgen Lukoschat, Wichita, KS (US); Andrew Kent Johnson, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 105 days.

(21) Appl. No.: 16/176,238

(22) Filed: Oct. 31, 2018

(65) Prior Publication Data

US 2019/0137628 A1    May 9, 2019

Related U.S. Application Data

(60) Provisional application No. 62/582,418, filed on Nov. 7, 2017.

(51) Int. Cl.
| | | |
|---|---|---|
| *G01S 17/93* | (2020.01) | |
| *B64D 47/08* | (2006.01) | |
| *G01S 17/87* | (2020.01) | |
| *G01S 17/86* | (2020.01) | |
| *G01S 17/933* | (2020.01) | |

(52) U.S. Cl.
CPC ............ *G01S 17/933* (2013.01); *B64D 47/08* (2013.01); *G01S 17/86* (2020.01); *G01S 17/87* (2013.01)

(58) Field of Classification Search
CPC ........ G01S 17/933; G01S 17/86; G01S 17/87; B64D 47/08; B64D 45/00
See application file for complete search history.

(56) References Cited

U.S. PATENT DOCUMENTS

| | | | |
|---|---|---|---|
| 5,465,142 A | 11/1995 | Krumes et al. | |
| 7,485,862 B2 | 2/2009 | Danziger | |
| 7,982,662 B2 | 7/2011 | Shaffer | |
| 8,089,617 B2 | 1/2012 | Fluckiger | |
| 9,196,168 B2 | 11/2015 | McCollough et al. | |
| 9,671,094 B2 | 6/2017 | Ball | |
| 9,740,209 B2 * | 8/2017 | Nakano | G05D 1/0088 |
| 2005/0029399 A1 * | 2/2005 | Lowe | B64D 47/08 244/118.1 |
| 2006/0287829 A1 * | 12/2006 | Pashko-Paschenko | B60Q 5/006 701/301 |
| 2009/0249900 A1 * | 10/2009 | Tschaggeny | G01C 19/08 74/5.7 |

(Continued)

FOREIGN PATENT DOCUMENTS

WO    2017055549 A1    4/2017

*Primary Examiner* — Rodney A Butler

(74) *Attorney, Agent, or Firm* — Erise IP, P.A.

(57) ABSTRACT

An obstacle avoidance system for an aircraft includes distance sensors mounted to the aircraft. The distance sensors each have one or more lasers for illuminating nearby obstacles and a detector for receiving laser light reflected off the nearby obstacles. A controller is configured for controlling the distance sensors and for determining distances between the distance sensor and the nearby obstacles based on data received from the detector. At least one camera may be externally mounted to the aircraft to provide images of the nearby obstacles. A user interface displays the images and the distances of the nearby obstacles.

14 Claims, 5 Drawing Sheets

(56) References Cited

U.S. PATENT DOCUMENTS

| | | | |
|---|---|---|---|
| 2010/0063672 A1* | 3/2010 | Anderson | G05D 1/0077 |
| | | | 701/29.2 |
| 2010/0102934 A1* | 4/2010 | Guichard | G06Q 10/08 |
| | | | 340/10.42 |
| 2011/0178658 A1* | 7/2011 | Kotaba | G01C 21/005 |
| | | | 701/3 |
| 2015/0194059 A1* | 7/2015 | Starr | G08G 5/065 |
| | | | 701/3 |
| 2015/0321768 A1* | 11/2015 | Kumar | B64D 45/00 |
| | | | 340/870.07 |
| 2017/0283038 A1* | 10/2017 | Lin | G05D 1/10 |
| 2018/0053427 A1 | 2/2018 | Cherepinsky et al. | |
| 2018/0059248 A1* | 3/2018 | O'Keeffe | G01S 7/484 |
| 2018/0086433 A1* | 3/2018 | Ichihara | B64C 27/06 |
| 2018/0162400 A1* | 6/2018 | Abdar | B60W 10/04 |
| 2019/0055017 A1* | 2/2019 | Oba | G01S 17/87 |
| 2019/0072966 A1* | 3/2019 | Zhang | G05D 1/0212 |

\* cited by examiner

OBSTACLE AVOIDANCE SYSTEM FOR AIRCRAFT

CROSS-REFERENCE TO RELATED APPLICATIONS

This application claims the benefit of U.S. Provisional Patent Application Ser. No. 62/582,418 entitled Obstacle Avoidance System for Aircraft and filed Nov. 7, 2017, the disclosure of which is herein incorporated by reference in its entirety.

BACKGROUND

1. Field of the Disclosure

Embodiments of this disclosure relate generally to obstacle avoidance, and more specifically, to a network of sensors onboard a vehicle that is capable of detecting obstacles and determining their distance from the vehicle for preventing collisions.

2. Description of the Related Art

U.S. Pat. No. 5,465,142 to Krumes et al. discloses an obstacle avoidance system for aircraft that includes a LADAR optics head that emits a beam of laser energy and receives returns from objects. U.S. Pat. No. 7,485,862 to Danziger discloses a time-spaced multiplexed LADAR system in which multiple lasers illuminate at different angles, and pulses reflected from the target are received by detectors. U.S. Pat. No. 7,982,662 to Shaffer discloses a scanning array for obstacle detection and collision avoidance. U.S. Pat. No. 8,089,617 to Fluckiger discloses a laser detection and ranging system that transmits multiple beamlets within a field-of-view and receives backscattered light reflected from a target. U.S. Pat. No. 9,671,094 to Ball discloses a laser positioned in a housing such that its laser beam is transmitted at an angle and its path forms a cone as the housing rotates to detect an object or topography and produce obstacle avoidance warnings. International Patent Publication WO 2017/055549 to Boucourt et al. discloses a wide-field laser ranging architecture with an echo detector that detects echoes of laser pulses reflected by an obstacle.

SUMMARY

In an embodiment, an obstacle avoidance system for an aircraft includes multiple distance sensors mounted to the aircraft. The distance sensors each have one or more lasers for illuminating nearby obstacles and a detector for receiving laser light reflected off the nearby obstacles. A controller is configured for controlling the distance sensors and for determining distances between the distance sensor and the nearby obstacles based on data received from the detector.

An obstacle avoidance system for an aircraft includes multiple lasers externally mounted to the aircraft for illuminating nearby obstacles with laser light and at least one detector externally mounted to the aircraft for receiving laser light reflected off of the nearby obstacles. A controller determines distances of the nearby obstacles based on information received from the at least one detector. At least one camera that is externally mounted to the aircraft provides images of the nearby obstacles, and a user interface displays the images and the distances of the nearby obstacles.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure provide a system for warning pilots and ground personnel of nearby obstacles to avoid potential collisions with aircraft. In certain embodiments, the system may be used by pilots in the aircraft cockpit, or by ground personnel outside the aircraft (e.g., via a mobile device), or by a user from a remote location (e.g., via a mobile device or network-connected computer). While embodiments described in detail herein rely on light-based/laser-based detection and ranging technologies (e.g., LIDAR/LADAR, also known as laser scanning), these exemplary technologies enable the presently disclosed system but are in no way limiting. For example, the system may be implemented with other types of detection and ranging technologies, such as those based on radio waves (e.g., RADAR).

Figure 1:
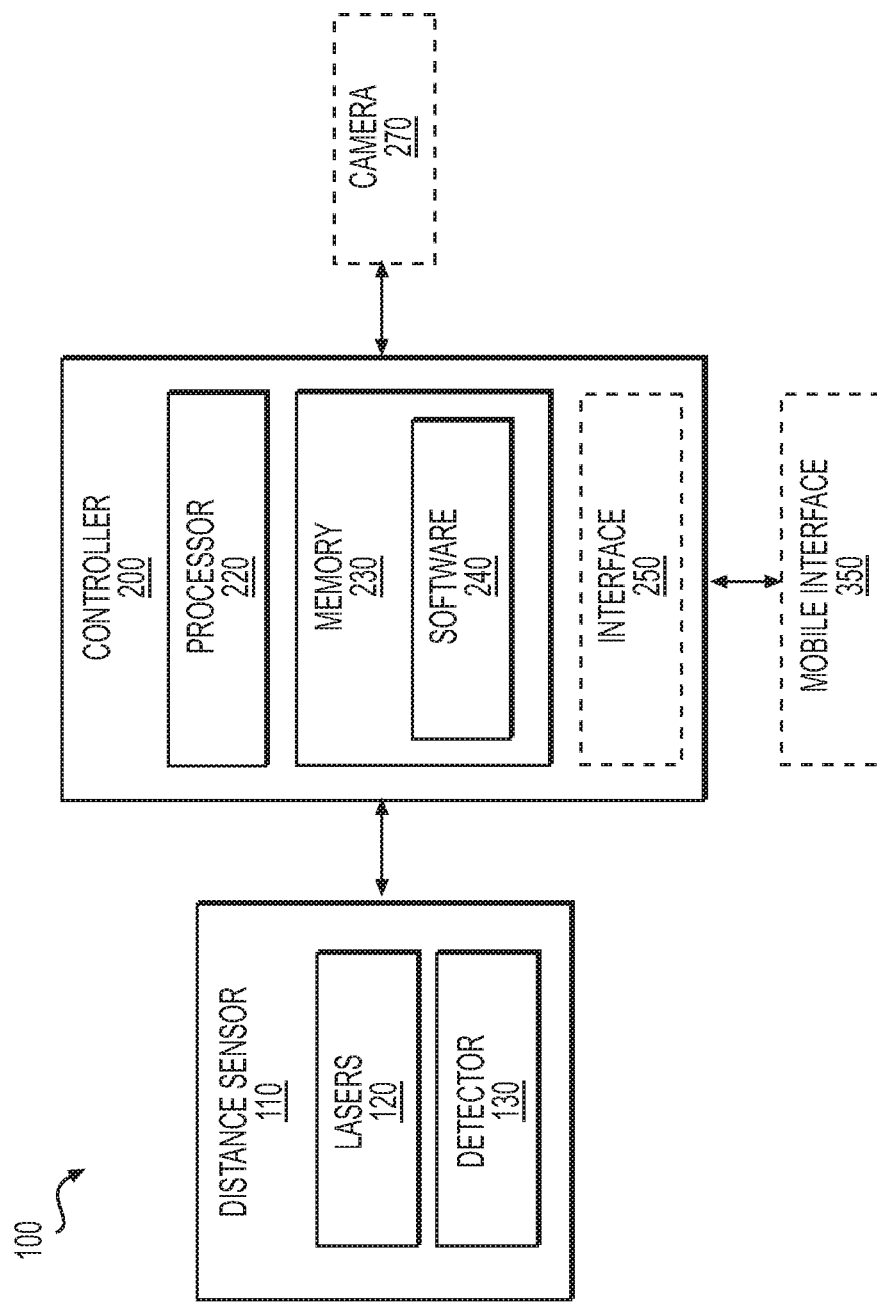
FIG. 1 is a block diagram of an obstacle avoidance system for aircraft, in an embodiment.

FIG. 1 is a block diagram of an exemplary obstacle avoidance system 100 for aircraft. A distance sensor 110 provides means of detection and ranging of nearby objects by illuminating nearby objects using lasers 120 and receiving laser light reflected off of the nearby objects using detector 130. Lasers 120 include one or more lasers for emitting collimated light within a narrow wavelength spectrum (e.g., infrared light). In certain embodiments, lasers 120 may be used to produce short pulses of light. In some embodiments, detector 130 is a photodetector (e.g., a photodiode) that receives laser light within a predetermined wavelength spectrum (e.g., by using filters).

In certain embodiments, ranging (e.g., determining distance measurements) may be performed using time-of-flight measurements. For example, one or more pulses of laser light are emitted by lasers 120. Each pulse produces an echo after reflecting off of nearby objects that may be received by detector 130. Receipt of the echo provides detectability of objects by system 100. The amount of time between the pulse emitted and the echo received is used to determine a distance between the distance sensor 110 and an object based on the speed of light.

A controller 200 is configured to communicate with distance sensor 110 by one of a wired and/or wireless communication medium. Controller 200 includes a memory 230, including a non-transitory medium for storing software 240, and a processor 220 for executing instructions of software 240. Memory 230 in some embodiments is a memory system that includes both transitory memory such as RAM and non-transitory memory such as, ROM, EEPROM, Flash-EEPROM, magnetic media including disk drives, and optical media. Memory 230 stores software 240 as machine readable instructions executable by processor

220. Exemplary instructions of software 240 may include instructions for controlling lasers 120 (e.g., timing of laser pulses) and instructions for analyzing information received by detector 130 (e.g., signal processing instructions). In certain embodiments, controller 200 includes one or more of a computer, microprocessor, microcontroller, and programmable logic controller.

Optional user interface 250 provides a display for conveying information to a user and an input device (e.g., a mouse, keyboard, touchscreen, and/or microphone) for providing user input. In certain embodiments, an optional mobile interface 350 is used instead of, or redundantly with, user interface 250. Mobile interface 350 is an example of user interface 250 that may be embodied as an internet or cloud-based application accessible to a user via a smartphone, tablet, and/or laptop, for example. User interface 250 and mobile interface 350 may provide multisensory (e.g., audio and visual) alerts to notify the pilot or ground crew of nearby obstacles that present a potential for collision with aircraft 140.

In certain embodiments, an optional camera 270 (e.g., a video camera) provides real-time images (e.g., a live video feed) to user interface 250 and/or the mobile interface 350. The real-time images may be coupled with distance measurements provided via distance sensor 110 under control of controller 200. For example, distance values may be overlaid upon obstacles visible in the real-time images. The distance values may update in real-time (e.g., while the aircraft is moving). The real-time images provide context to the user (e.g., to determine if the nearby obstacle is stationary or mobile).

In some embodiments, controller 200 is adapted to operate the plurality of distance sensors when a weight-on-wheels signal is received indicating that the aircraft is on the ground. The weight-on-wheels signal may be provided by a flight computer or avionics system of the aircraft, for example. System 100 remains idle when a weight-on-wheels signal is off and automatically becomes active when a weight-on-wheels signal is on, to assist taxiing operations on the ground.

Figure 2:
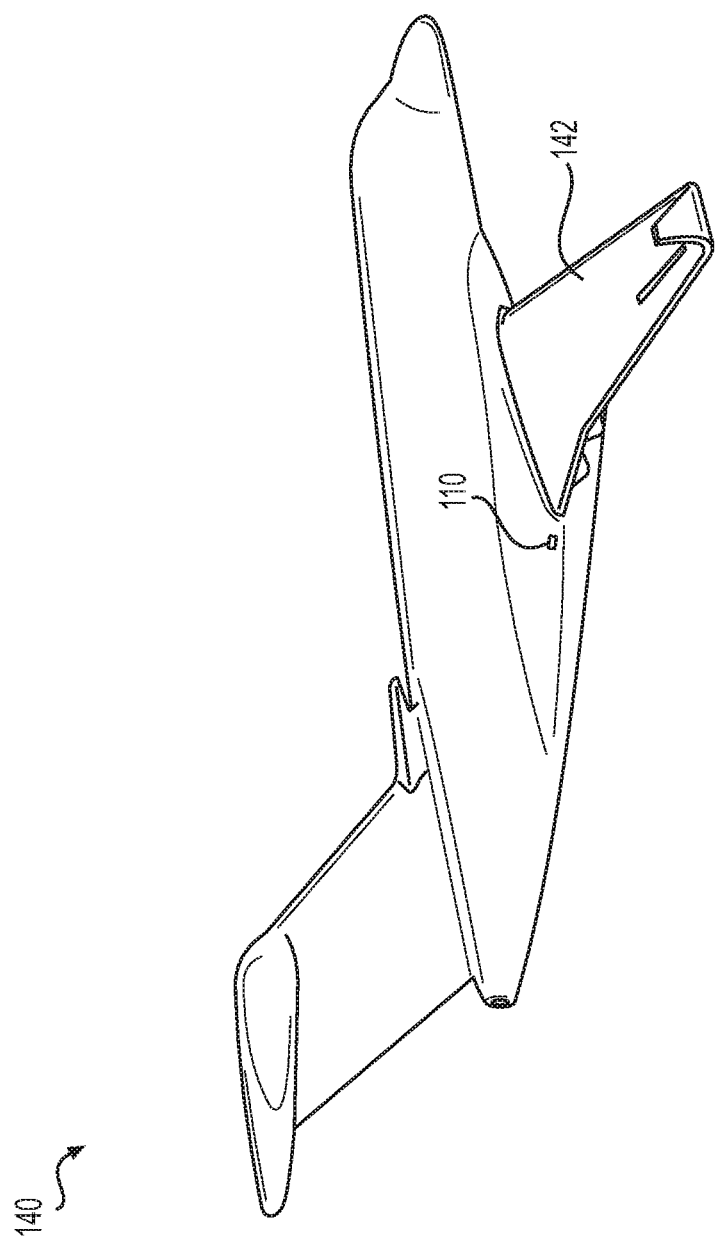
FIG. 2 is a perspective view of an aircraft having one embodiment of a distance sensor mounted thereto.

FIG. 2 is a perspective view of an aircraft 140 having distance sensor 110 mounted thereto. An exemplary location of distance sensor 110 is depicted in FIG. 2 on a main body of aircraft 140 (e.g., along the fuselage) at a position aft of the trailing edge of a wing 142 for detecting obstacles behind aircraft 140. In certain embodiments, a plurality of distance sensors 110 are mounted in a respective plurality of locations on an exterior of the aircraft for illuminating obstacles nearby wings and the aircraft fuselage.

Figure 3:
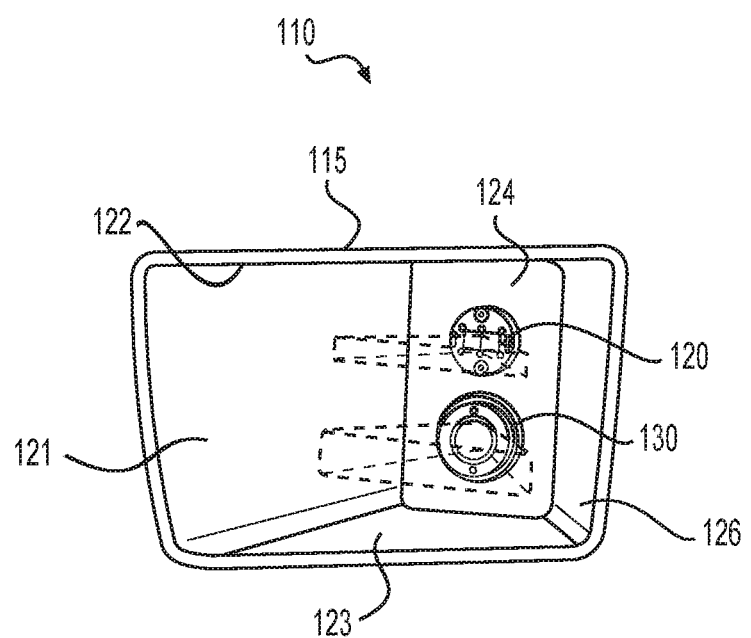
FIG. 3 is a close-up perspective view of the distance sensor of FIG. 2.

FIG. 3 depicts a close-up perspective view of distance sensor 110 mounted aft of wing 142. A housing 115 partially encloses lasers 120 and detector 130 to form a modular unit. Housing 115 may be inset into an outer skin of aircraft 140 to provide a flush mount, such that lasers 120 and detector 130 are retracted with respect to an external skin surface of aircraft 140. More specifically, housing 115 includes a gradually inwardly inclined plane 121 which is located between a roof 122 that is substantially parallel with and opposed to a floor 123. Inside housing 115, laser 120 and detector 130 are mounted on an outwardly-angled surface 124, which is angled in a desired direction for illuminating a certain area or field adjacent the aircraft via laser 120 to enable line of sight with obstacles (e.g., located aft of a wing on a starboard side). However, lasers 120 and detector 130 may be oriented in various alternate directions, without departing from the scope hereof. A third planar wall 126 completes the inset arrangement. In other words, the modular unit is installed with a flush mount, and the lasers 120 and detector 130 are recessed within housing 115 to avoid extending out into the passing airstream during flight.

Distance sensor 110 together with housing 115 provide a robust, compact, and low-profile component when distance sensor 110 is installed as a retrofit. This enables existing aircraft to easily be retrofitted with a modular unit that includes distance sensor 110, while providing a flush mount to avoid protruding beyond the aircraft skin into the airstream. Retrofitting an aircraft with distance sensor 110 may include cutting a hole in the fuselage for receiving housing 115.

Figure 4:
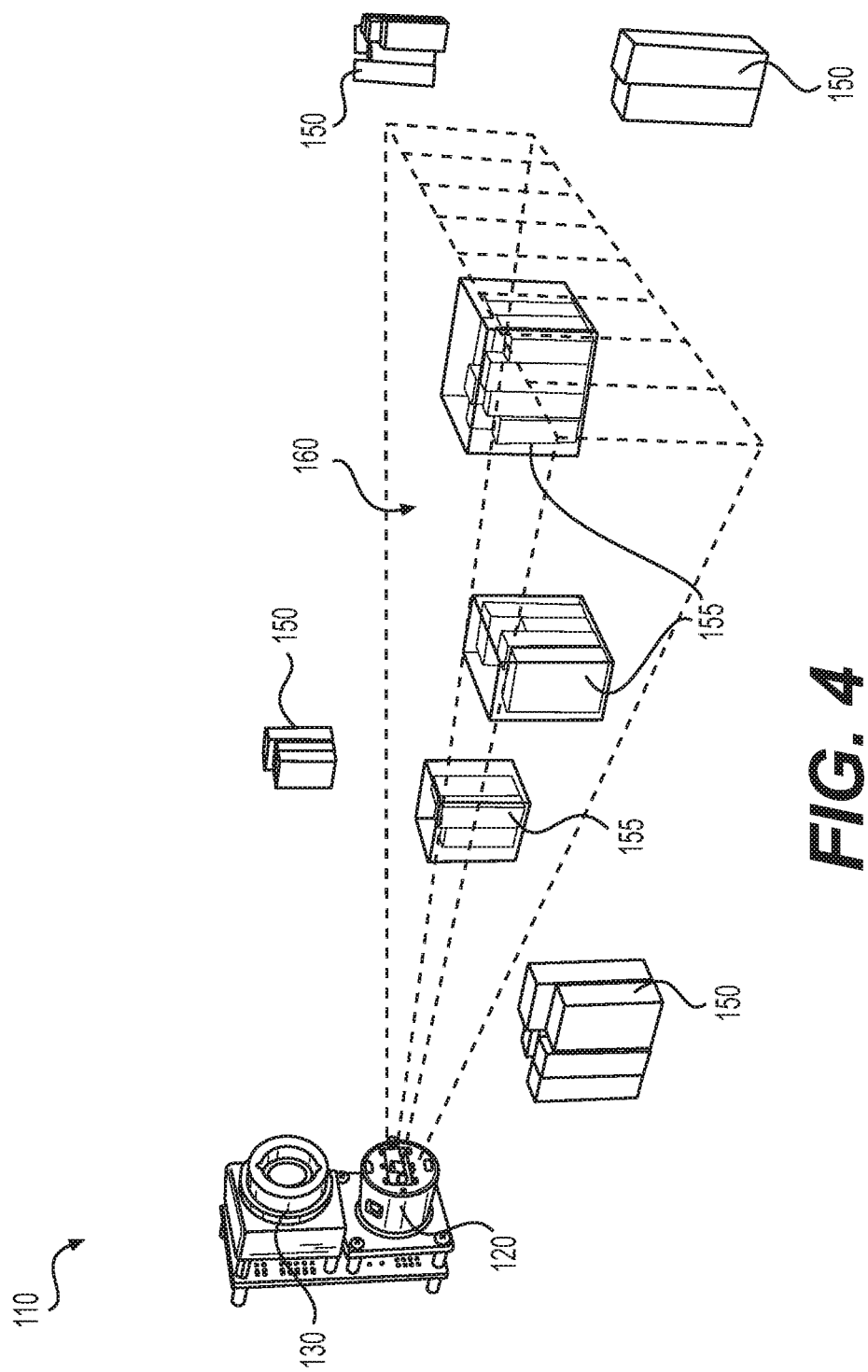
FIG. 4 is a perspective view of another embodiment of a distance sensor removed from an aircraft.

FIG. 4 is a perspective view of distance sensor 110 removed from aircraft 140. Lasers 120 are adapted to provide a laser-scanning pattern that illuminates an illumination field 160. In certain embodiments, the laser-scanning pattern is provided by one or more lasers 120 adapted to rotate (e.g., via a gimbal) for scanning across illumination field 160. In some embodiments, the laser-scanning pattern is provided by a plurality of lasers 120 that are stationary but directed at different angles to cover illumination field 160.

As depicted in FIG. 4, detectable objects 155 are located within illumination field 160, while undetectable objects 150 are outside of illumination field 160. In certain embodiments, illumination field 160 provides a sufficiently wide area to detect obstacles nearby an aircraft (e.g., an area that is wider than a wingspan of aircraft 140 and higher than an upper end of a tail of aircraft 140). In other embodiments, the entire distance sensor 110 (lasers 120 and detector 130) may optionally be mounted to a rotary device (e.g., a gimbal) such that the direction of illumination field 160 is adjustable under control of controller 220 for expanding detection.

In some embodiments, detector 130 includes a sensor array that is used to receive a plurality of echoes from a respective plurality of objects 155. In one embodiment, the sensor array of detector 130 includes seven sensors. Instructions of software 240 determine a plurality of distance measurements based on echoes reflected off of objects 155. Information about nearby objects may be relayed (e.g., via wireless communication media) to an avionics system of aircraft 140 and to a user through user interface 250 or other communication means onboard aircraft 140 and/or mobile interface 350.

Figure 5:
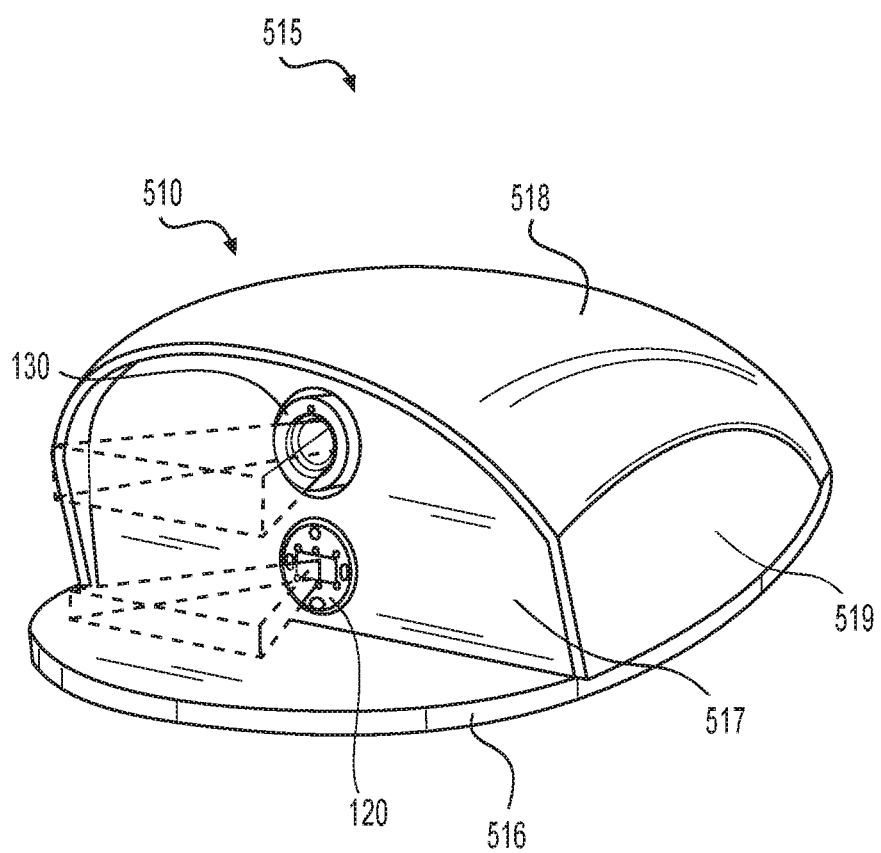
FIG. 5 is a perspective view of another embodiment of a distance sensor removed from an aircraft.

FIG. 5 is a perspective view of another exemplary distance sensor 510 removed from aircraft 140. As depicted in FIG. 5, distance sensor 510 is configured as a modular unit 515 that provides a zero-impact component that requires no structural modifications to the airframe when installed as a retrofit. A simple mounting mechanism is used for mounting modular unit 515 to an aircraft surface. More specifically, an underside of modular unit 515 includes an outwardly-extending floor 516 that increases the size of the mounting bottom for improved securement. The installation may include a tray interface (not shown). For example, a tray is fixed directly to the fuselage using rivets and floor 516 slides into and locks within the tray. Alternatively, floor 516 is mounted directly to the fuselage using rivets.

Laser 520 and detector 530 are mounted through an inset face 517 that is angled to provide line of sight with potential obstacles within an area adjacent the aircraft (e.g., illumination field 160, FIG. 4). An outer surface of modular unit 515 includes a curved portion 518 and lateral side walls 519 adapted to provide an aerodynamically-favorable profile such that modular unit 515 may be mounted externally to a surface of the aircraft in such a way as to protrude into the airstream during flight. In other words, modular unit 515 is mounted to the aircraft such that inset face 517 faces in a generally aft direction where it is substantially shielded from the airstream during flight.

The embodiment depicted in FIG. 5 enables rapid installation for testing and/or retrofitting to existing aircraft. Because distance sensor 510 is configured for wireless communication, in some embodiments obstacle avoidance system 100 includes a plurality of distance sensors 510 (e.g., mounted to various locations of aircraft 140) that, together with controller 200, form a wireless network. A plurality of distance sensors 510 provides a plurality of fields (e.g., a plurality of illumination field 160) for detecting objects. The plurality of fields 160 may provide a wider overall field-of-view for detecting objects and the plurality of fields 160 may overlap providing redundant information. Software 240 may provide instructions for analyzing information from a plurality of distance sensors 110 to more accurately determine the number and distance of obstacles based on e.g., redundant information. In certain embodiments, software 240 provides instructions for analyzing echo data from more than one distance sensor 110 to determine positions of objects 155 by triangulation.

It should be noted that numerous different the kinds of unit housing arrangements incorporating the broad aspects disclosed herein may be used on the same aircraft. For example, a single aircraft may include one of more of the kinds of inset housing units 115 disclosed in FIG. 3 along with one or more of the outwardly-extending mounted units 515 shown in FIG. 5.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An obstacle avoidance system for an aircraft, comprising:
    a plurality of distance sensors mounted to the aircraft, the plurality of distance sensors each having one or more lasers for illuminating nearby obstacles and a detector for receiving laser light reflected off the nearby obstacles, wherein the plurality of distance sensors provide a laser-scanning pattern in a two-dimensional plane that extends wider than a wingspan of the aircraft and higher than a tail of the aircraft for identifying potential collisions with nearby obstacles;
    a controller configured for controlling the plurality of distance sensors and for determining distances between each distance sensor and the nearby obstacles based on data received from each detector;
    a user interface for displaying information about the distances, wherein the user interface provides an alert when a nearby obstacle has been identified for a potential collision; and
    at least one camera mounted to the aircraft for imaging an area adjacent the aircraft, wherein information about distances of nearby obstacles is coupled with images from the at least one camera and displayed on the user interface.

2. The obstacle avoidance system of claim 1, wherein the user interface is a mobile interface for providing information about distances of nearby obstacles remotely.

3. The obstacle avoidance system of claim 1, wherein the plurality of distance sensors are mounted in a respective plurality of locations on an exterior of the aircraft for illuminating obstacles nearby wings and a fuselage of the aircraft.

4. The obstacle avoidance system of claim 3, wherein the plurality of distance sensors are mounted in an aft-facing direction for illuminating obstacles behind the wings and the fuselage of the aircraft.

5. The obstacle avoidance system of claim 1, wherein the plurality of distance sensors each include a flush mount such that the one or more lasers and the detector are retracted with respect to an outer skin surface of the aircraft.

6. The obstacle avoidance system of claim 1, wherein the controller is adapted to operate the plurality of distance sensors when a weight-on-wheels signal is received indicating that the aircraft is on the ground.

7. An obstacle avoidance system for an aircraft, comprising:
    at least one laser externally mounted to the aircraft for illuminating nearby obstacles with laser light;
    at least one detector externally mounted to the aircraft for receiving laser light reflected off of the nearby obstacles;
    a controller for determining distances of the nearby obstacles based on information received from the at least one detector;
    at least one camera externally mounted to the aircraft for providing images of the nearby obstacles;
    a user interface for displaying the images and the distances of the nearby obstacles;
    the at least one laser is adapted to illuminate an illumination field adjacent the aircraft wherein the illumination field extends wider than a wingspan of the aircraft and higher than a tail of the aircraft for identifying potential collisions with nearby obstacles;
    the at least one camera is adapted to capture images of the illumination field adjacent the aircraft and the user interface is adapted to display the images of the illumination field; and
    the user interface is adapted to display distances of nearby obstacles overlaid upon images of the illumination field and update the distances in real time while the aircraft is moving.

8. The obstacle avoidance system of claim 7, further comprising a housing that partially encloses the at least one laser and the at least one detector to form a modular unit, wherein the modular unit may be installed on existing aircraft as a retrofit, and the housing is mounted flush within an external surface of the aircraft.

9. The obstacle avoidance system of claim 7, wherein the at least one laser, the at least one detector, and the at least one camera are oriented in an aft-facing direction such that the illumination field is positioned behind the wings and fuselage of the aircraft.

10. The obstacle avoidance system of claim 7, wherein the user interface provides images of nearby obstacles with distance information for avoiding collisions while taxiing the aircraft.

11. The obstacle avoidance system of claim 7, wherein the system remains idle when a weight-on-wheels signal is off, and the system becomes active when a weight-on-wheels signal is on.

12. The obstacle avoidance system of claim 7, wherein the at least one laser emits pulses of laser light, wherein each pulse produces an echo after reflecting off of nearby objects, such that the controller determines distances to the nearby objects based on time-of-flight measurements of the pulses of laser light.

13. The obstacle avoidance system of claim 1, wherein the plurality of distance sensors comprise a sensor array configured to receive a plurality of echoes reflected off of one or more objects adjacent the aircraft, wherein the controller determines one or more distance measurements for the one or more objects, respectively, based on the plurality of echoes received.

14. The obstacle avoidance system of claim 13, wherein the sensor array is configured to provide redundant information about the one or more objects adjacent the aircraft, and the controller is adapted to analyze the redundant information such that the controller determines one or more distance measurements with improved accuracy for the one or more objects, respectively, based on the redundant information.

* * * * *